Jan. 17, 1967    P. J. GEPPERT    3,299,232
INTERLOCK STRUCTURE FOR BUS DUCT
PLUG COVER SWITCHING MECHANISM
Filed April 1, 1966    5 Sheets-Sheet 3
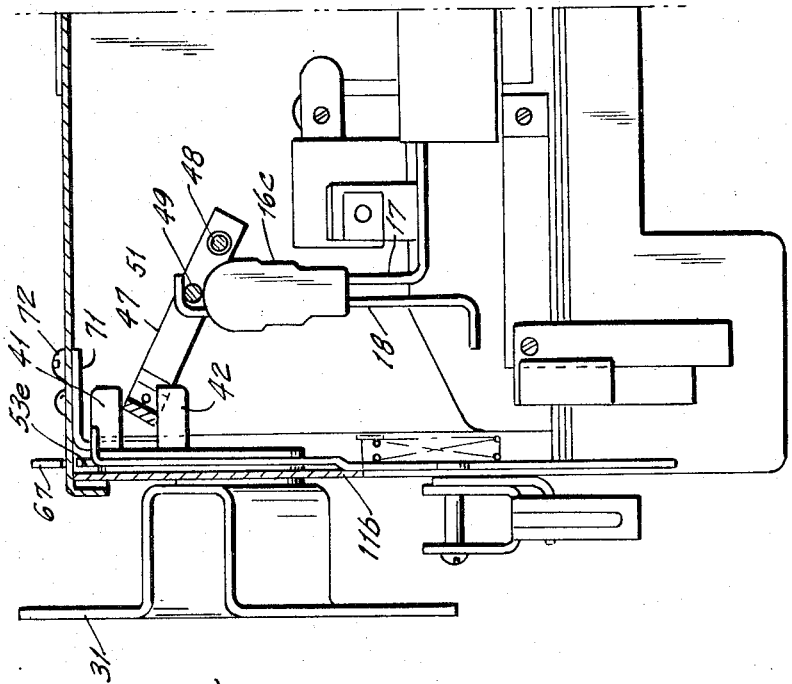
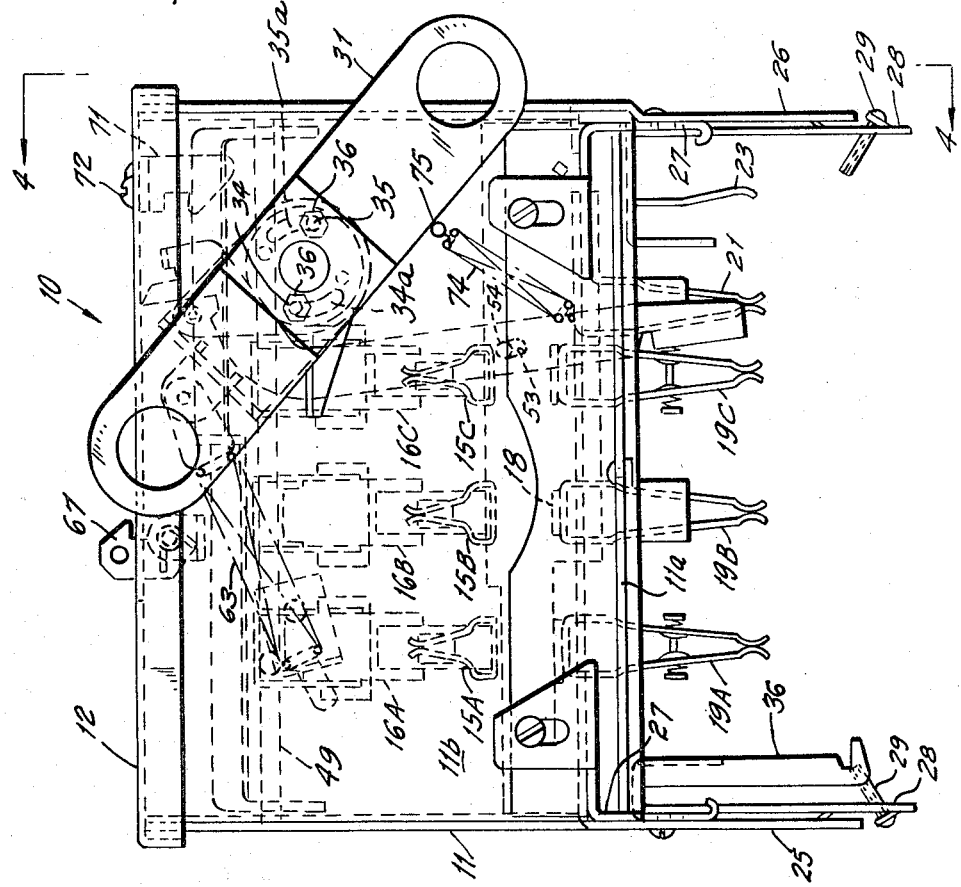

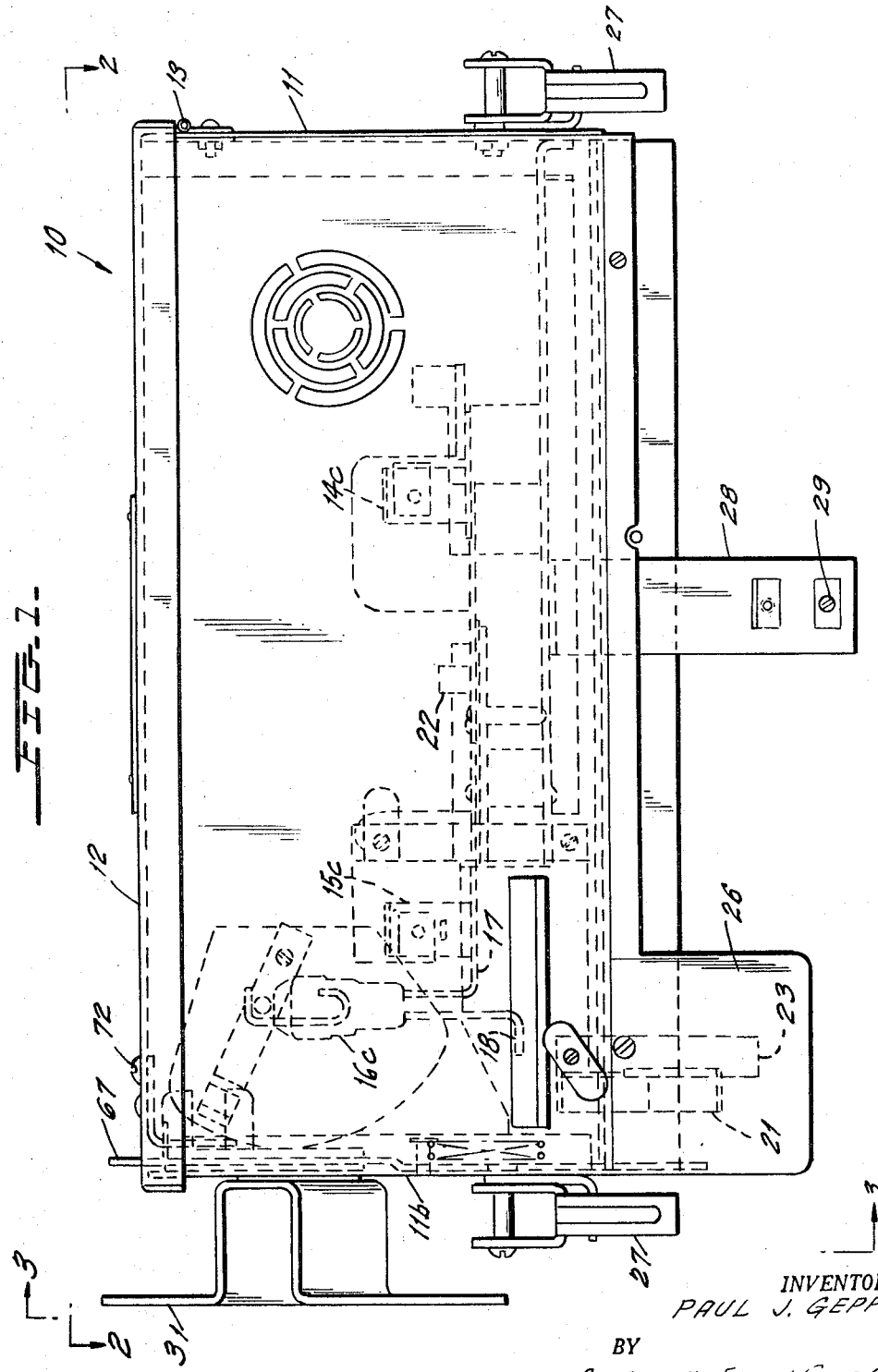

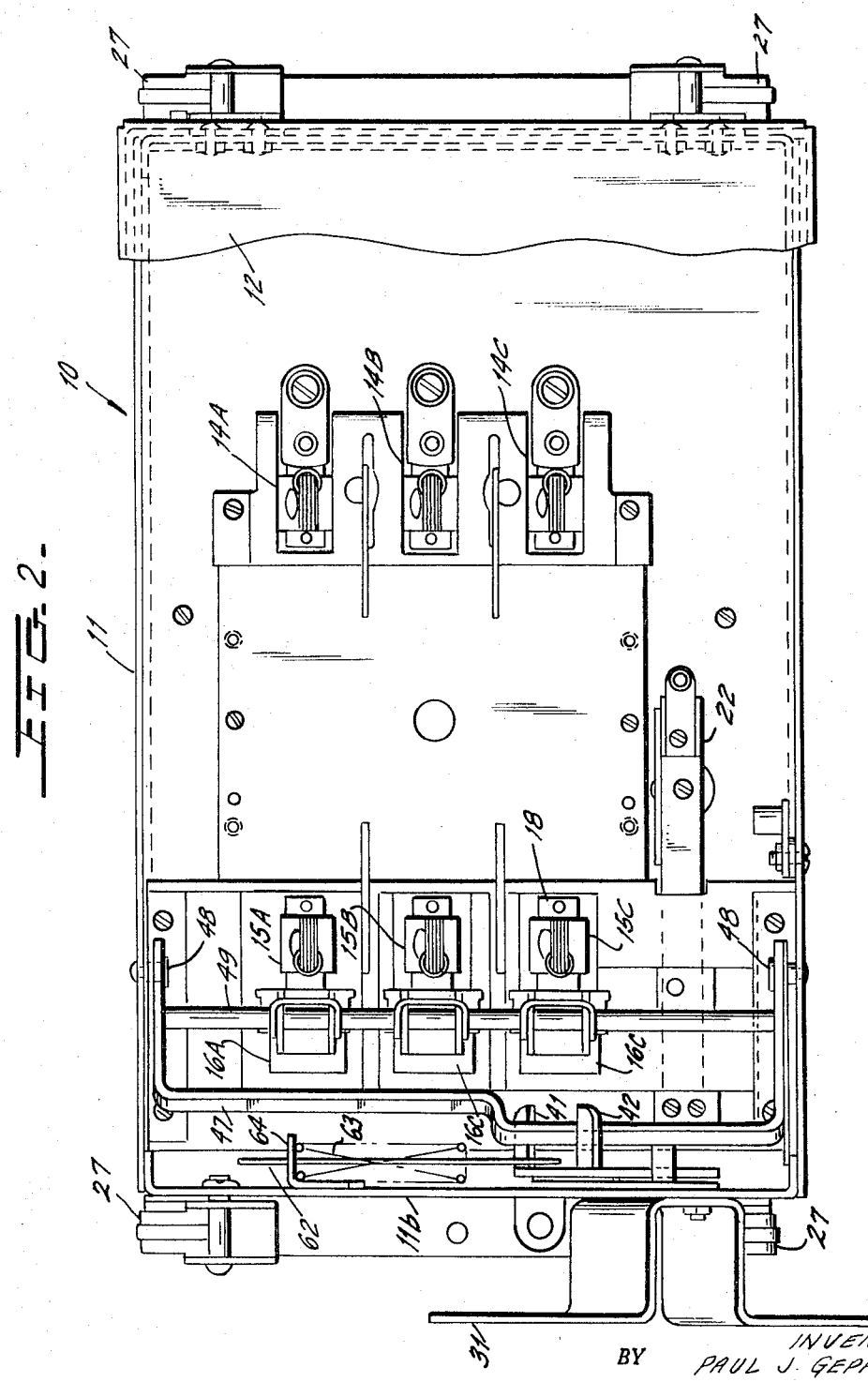

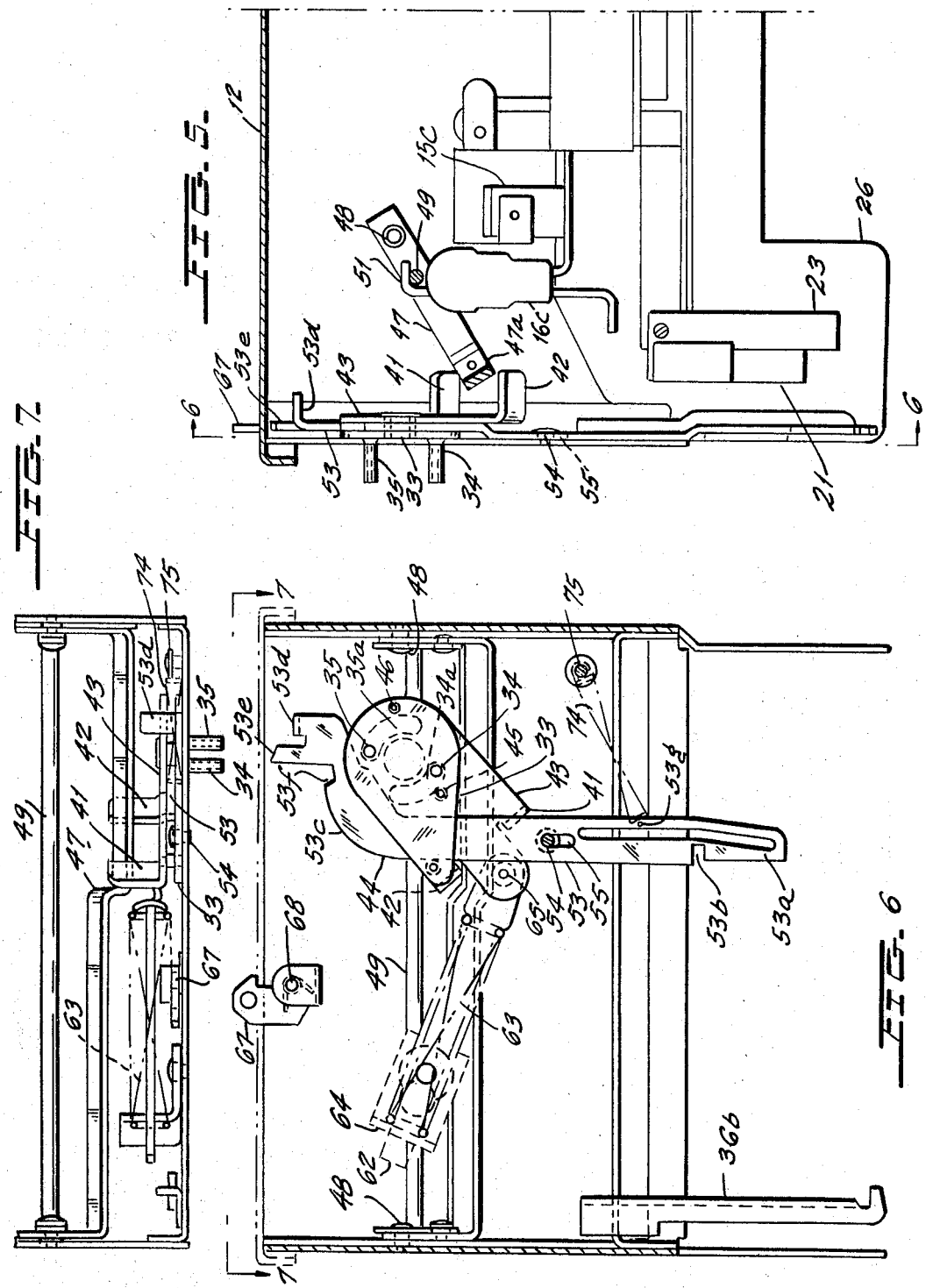

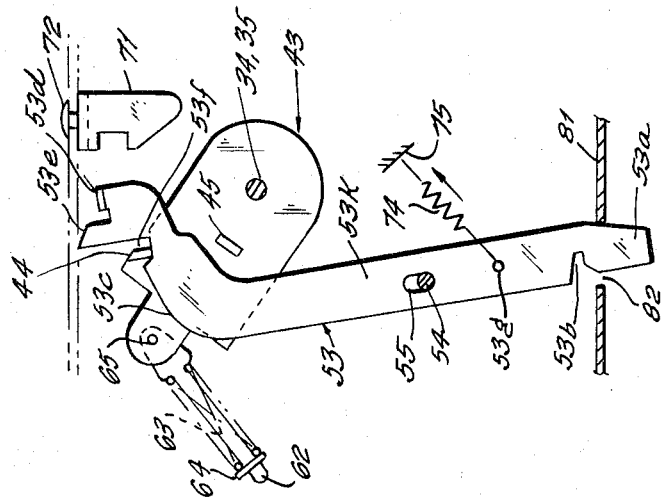
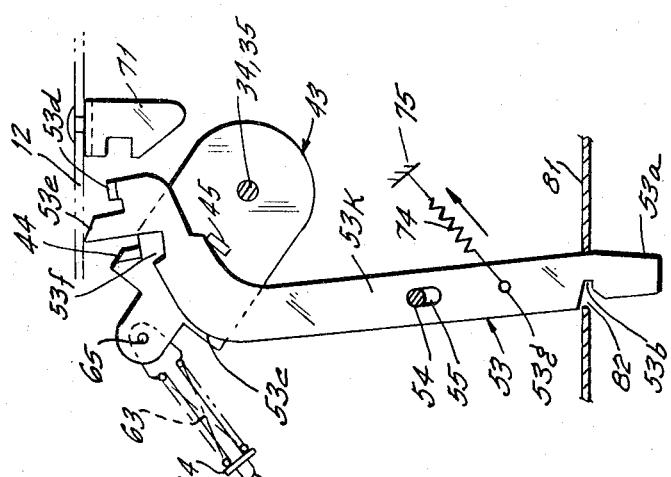
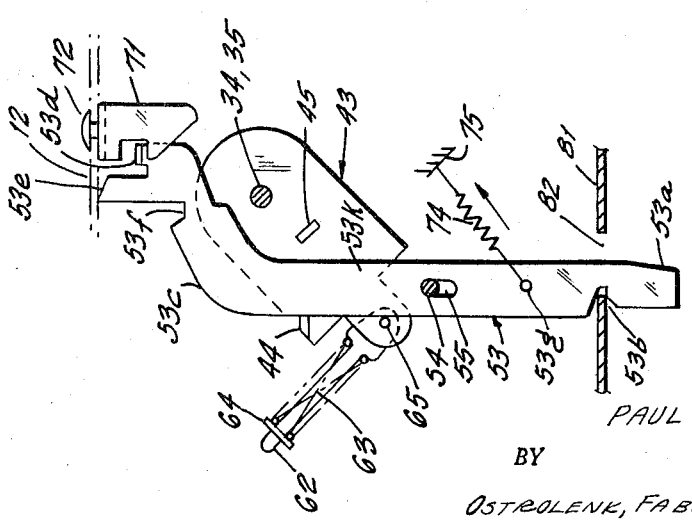

United States Patent Office 3,299,232
Patented Jan. 17, 1967

3,299,232
INTERLOCK STRUCTURE FOR BUS DUCT PLUG COVER SWITCHING MECHANISM
Paul J. Geppert, Redford Township, Mich., assignor to I-T-E Circuit Breaker Company, Philadelphia, Pa., a corporation of Pennsylvania
Filed Apr. 1, 1966, Ser. No. 539,338
10 Claims. (Cl. 200—50)

This invention relates to plug-in units for tapping power from bus duct electric power distribution systems. More particularly this invention relates to plug-in units of this type which are more economical to produce and/or are more reliable in operation than the plug-in unit constructions disclosed in U.S. Patent No. 3,048,672, issued on Aug. 7, 1962 to J. B. Cataldo et al. for a Safety Bus Duct Plug and U.S. Patent No. 2,984,769, issued May 16, 1961 to C. B. Turton for a Plug-In Type Busway With Interlocking Plug.

Bus duct electric distribution systems consist of a plurality of elongated bus bars disposed within an elongated housing in insulated relationship and extending parallel to the axis of the enclosure. The duct housing is provided with a plurality of openings, usually covered by openable covers, for the purpose of permitting conducting fingers extending from the plug-in unit to extend into the duct housing and engage the duct bus bars.

The plug-in unit is provided with a multiphase switching device having line terminals in series with the plug-in unit conducting fingers and load terminals connected to the device to be energized. In plug-in units of the type under consideration the contact fingers are fixed in relation to the plug-in unit housing. Thus, in order to prevent arcing between the contact fingers and the duct bus bars, it becomes essential to provide a mounting interlock to assure that the switching device is open at the time the plug-in unit is being mounted to or dismounted from the duct. For reasons of safety it is necessary to prevent closing of the switching device when the plug-in unit cover is opened and also for reasons of safety is necessary to prevent opening of the plug-in unit cover once the switching device is closed. However, under certain conditions it is necessary to be able to open the cover when the switching device is closed and for this purpose the instant invention provides a defeater mechanism.

Accordingly it is a primary object of the instant invention to provide a novel construction for a plug-in unit of this type in which a single member mounted for both pivotal and sliding movement is part of the cover interlock, the switching interlock and the mounting interlock.

Still another object is to provide an especially compact economical and reliable construction for a plug-in unit of the type under consideration.

These as well as other objects of this invention will become readily apparent after reading the following description of the accompanying drawings in which:

FIGURE 1 is an elevation of a bus duct plug-in unit constructed in accordance with the teachings of the instant invention.

FIGURE 2 is an elevation looking in the direction of arrows 2—2 of FIGURE 1 with a major portion of the plug cover cutaway to reveal the elements within the plug housing.

FIGURE 3 is an end view looking in the direction of arrows 3—3 of FIGURE 1.

FIGURES 4 and 5 are partial side elevations looking in the direction of arrows 4—4 of FIGURE 3 with the near side of the plug housing cutaway and certain elements removed to more clearly reveal the relationship between more significant elements. In FIGURE 4 the plug switching device is open while in FIGURE 5 the switching device is closed.

FIGURE 6 is a cross section taken through line 6—6 of FIGURE 5 looking in the direction of arrows 6—6.

FIGURE 7 is a fragmentary elevation looking in the direction of arrows 7—7 of FIGURE 6.

FIGURES 8A, 8B and 8C are schematic representations illustrating the operation of the various interlocks of the plug-in unit of FIGURES 1 through 7.

Now referring to the figures and more particularly to the embodiment illustrated in FIGURES 1 through 7. Bus duct plug-in unit 10 is provided with generally rectangular housing 11 constructed of sheet metal and having an openable cover 12 mounted at one end thereof to hinges 13 (FIGURE 1). As seen in FIGURE 2, mounted within housing 11 are a first set of fuse terminal assemblies 14A, 14B, 14C spaced from another set of fuse terminals assemblies 15A, 15B, 15C to receive the contact blades of fuses (not shown). Switch heads 16A, 16B, 16C of a type described in detail in U.S. Patent No. 2,287,676, issued June 23, 1940 to W. H. Frank et al. and entitled Switch, are disposed within housing 11 and constitute a switching means. Each of the switch heads is provided with a load terminal 17 and a line terminal 18 (see FIGURE 1) with the load terminals 17 of the respective switch heads 16A, 16B, 16C being electrically connected to the respective fuse terminal assemblies 15A, 15B, 15C. The line terminals 18 of the respective switch heads 16A, 16B, 16C are electrically connected to conducting fingers 19A, 19B, 19C, respectively (see FIGURE 3) which project beyond the confines of housing 11 through wall 11a thereof so as to be engageable with different bus bars of a bus duct when plug 10 is in final mounting position with respect to such bus duct. Also projecting through wall 11A is grounding finger 21 connected to ground terminal means 22 within housing 11 (FIGURE 2). Grounding contact 21 is adapted to engage the grounded bus of a plug-in duct while finger 23, also projecting from housing 11, is adapted to engage the duct housing.

Since the portions of fingers 19A, 19B, 19C projecting from housing 11 are not insulated it is essential that the doors or shutters (not shown) over the bus duct access openings are fully opened prior to movement of plug 10 into final position with respect to the bus duct. As fully explained in the aforesaid U.S. Patent No. 3,048,672 shutter interlock finger 366 is provided for this purpose. Finger 366 performs the additional function of positively establishing the required positioning of plug 10 along the length of the bus duct. Flanges 25, 26 are provided to facilitate mounting of plug 10 to the bus duct while hook assemblies 27 provide mechanical securement of plug 10 as fully described in the copending U.S. patent application Serial No. 483,639, filed Aug. 30, 1965, entitled Bus Duct Plug Mounting Device with R. S. Davis as inventor. Plug housing extensions 28 are provided with screws 29 at the free ends thereof for the purpose of making good electrical contact with the duct housing to place the duct and plug housings at the same electrical potential.

Manual operating handle 31 for switching device 16A, 16B, 16C is pivotally mounted externally of housing 11 on the end wall 11B thereof closest to contact fingers 19A, 19B, 19C. Threaded pins 34, 35 extending from plate-like member 33 at right angles to the plane thereof pass through arcuate slots 34A, 35A, respectively, in housing wall 11B, through clearance holes in handle 31 and are engaged by nuts 36, 36. Thus, handle 31 and member 33 are connected together to move in unison.

Member 33 is part of the cam assembly including another plate-like member 43. Spacer rivets 44, 45, 46 (FIGURE 6) fixedly secure members 33, 43 to one another in spaced parallel relationship. Member 43 is provided with ears 41, 42 projecting away from end wall 11b. Web 47a of U-shaped operating crank 47 is disposed between ears 41, 42 for a reason which will hereinafter become apparent. Crank 47 extends transversely across housing 11 within the confines thereof with rivets 48, 48 at the free ends of the crank arms pivotally mounting crank 47 to opposed walls of housing 11. Operating rod 49, extending parallel to web 47a, is anchored at its ends to the arms of crank 47 at points between rivets 48, 48 and web 47a.

Each of the switch heads 16A, 16B, 16C is provided with a hook 51 which engages rod 49 in a manner well known to the art. As crank 47 is pivoted counterclockwise from its position of FIGURE 4 to that of FIGURE 5, the movable portions of switch heads 16A, 16B, 16C move downward and in this manner multiphase switching device is operated from open to closed position.

One end of guide rod 62 for switching means operating spring 63 extends through a clearance aperture in bracket let 64 while the other end of rod 62 is pivotally mounted at 65 to member 43 at an extension thereof positioned between ears 41, 42.

Elongated member 53, interposed between plate-like members 33, 43, extends between spacers 44, 45. Rivet 54, extending through enlongated slot 55 in member 53 at a point intermediate the ends thereof, pivotally mounts member 53 to end wall 11B. As seen in FIGURES 3 and 6, the lower end 53A of member 53 extends through housing wall 11a generally parallel to contact fingers 19A, 19B, 19C. This lower end 53A projects far enough so that upon mounting of plug 10 to a duct if end 53A engages the duct housing, such engagement will take place prior to engagement of contact fingers 19A, 19B, 19C with the bus bars of the duct for a reason which will hereinafter become apparent. End portion 53A of member 53 is provided with notch 53B positioned to receive a portion of the duct housing after the plug 10 is mounted to the duct and switching means 16A, 16B, 16C is closed.

The portion of member 53 above slot 55 is provided with curved edge portion 53C which terminates in an end section having transversely extending cover latch ear 53D, upwardly extending cover engageable projection 53E and notch 53F. Projection 53E is positioned between notch 53F and ear 53D with the latter being at the upper section of member 53 most remote from slot 55.

Tension spring 74 is secured at one of its ends to member 53 at aperture 53G thereof while the other end of spring 74 is secured to pin 75 extending inwardly from housing wall 11B. Spring 74 is so positioned that it biases member 53 in a counterclockwise and upward direction with respect to FIGURE 6.

Hook-shaped catch 71 (FIGURE 3) is pivotally mounted to cover 12 on the inside thereof and is operable from a point outside of cover 12 by a screwdriver or the like entered into the slot in head 72. Biasing means (not known in FIGURES 1 through 7) urges catch 71 to its latching position shown in FIGURE 3. As will be hereinafter explained, catch 71 in its latching position co-operates with ear 53D to maintain cover 12 latched closed when switching means 16A, 16B, 16C is closed. The unlatching position for catch 71 is to the right with respect to the position occupied by catch 71 in FIGURE 3.

In a manner well known to the art, hook 67 is pivotally mounted at 68 to end wall 11B and is biased in a clockwise direction with respect to FIGURE 6 to a holding position maintaining cover 12 against accidental opening once cover 12 is closed.

Now referring to FIGURES 8A, 8B and 8C for an explanation of operation for the interlocks associated with switching means 16A, 16B, 16C. It is noted that even though the elements shown in FIGURES 8A, 8B and 8C do not have the precise forms of the elements illustrated in FIGURES 1 through 7, nevertheless the reference numerals assigned to the elements of FIGURES 8A, 8B, 8C are the same reference numerals for elements in FIGURES 1 through 7 having like functions.

When plug 11 is being mounted to a bus duct, tip extension 53A of member 53 enters duct housing 81 through notch 82. FIGURE 8C shows the positons of elements 43, 53 and 71 when plug 11 is mounted to duct housing 81 with cover 12 closed and the plug switching means 16A, 16B, 16C closed. Under these circumstances notch 53B, receives a portion of duct housing 81 to prevent dismounting of plug 11 from the bus duct. At this time cover 12 cannot be opened since ear 53B is disposed within the hook portion of catch 71. The presence of shutter interlock finger 366 and its receiving aperture (not shown) in housing 81 prevents movement of plug 11 to defeat the function of notch 53B. If, for purposes of servicing it becomes necessary to open cover 12 with member 43 in its switch closed positon of FIGURE 8C, screw 72 may be pivoted in the appropriate direction to move catch 71 to the right with respect to FIGURE 8C to a position clear of ear 53B. Then member 67 (FIGURE 6) may be operated counterclockwise to permit opening of cover 12.

When member 43 is pivoted clockwise about pivot 34, 35 as a center to the switch open position of FIGURE 8B, pivot 44 becomes disengaged from member 53 thereby permitting spring 74 to pivot member 53 in a counterclockwise direction about rivet 54 as a center. Now tip 53A is positioned in alignment with notch 82 to permit withdrawal of tip 53A from within the confines of duct housing 81. In addition, ear 53D is no longer engaged by catch 71 so that cover 12 may be opened merely by operating member 67.

With the elements in the positions illustrated in FIGURE 8B, opening of cover 12 permits springs 74 to move member 53 upwardly in a direction generally parallel to the longitudinal axis of the main portion 53K to the position of FIGURE 8A. In this latter position rivet 44 is disposed within notch 53F so that member 53 blocks counterclockwise rotation of member 43 to switch closed position.

Considering the sequence of operation starting with the elements in their positions of FIGURES 8A. The closing of cover 12 brings cover 12 into engagement with projection 53E forcing member 53 downward so that rivet 44 is no longer positioned within notch 53F and the elements are now in the positions of FIGURE 8B. Thereafter, rotation of member 43 in a counterclockwise direction to switch closed position causes rivet 44 to engage member 53 along its curved edge 53C thereby pivoting member 53 in a clockwise direction about rivet 54 to the position illustrated in FIGURE 8C wherein a portion of duct housing 81 enters notch 53B.

It is noted, that if prior to the mounting of plug 11 to duct housing 81 switching means 16A, 16B, 16C is closed, tip 53A will be misaligned with respect to notch 82 when an attempt is made to mount plug 11 to housing 81. Accordingly, tip 53A cannot enter housing 81 and conducting fingers 19A, 19B, 19C cannot engage the duct bus bars.

Thus, it is seen that tip 53A together with notches 53B and 82 constitute an interlock means which prevents mounting or dismounting of plug 11 when tip 53A is in its holding position of FIGURE 8C and will only permit mounting and dismounting of plug 11 when tip 53A is in its releasing position of FIGURES 8B and 8C. Ear 53D in cooperation with catch 71 provides a defeatable interlock which prevents the opening of cover 12 when switching means 16A, 16B, 16C is closed.

Thus, it is seen that in the construction hereinbefore described the single member 53 is pivotally and slidably mounted by pin-slot type connection 54, 55. Member 53 includes tip 53A and recess 53B forming parts of the mounting interlock means, notch 53F and extension 53E forming parts of the switching interlock means, and ear 53D forming part of the cover interlock means.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A plug unit for tapping electrical power from a multi conductor bus duct; said plug unit including a housing having a openable cover; a plurality of conducting fingers for engaging different bus bars of a duct when said plug unit is mounted to such duct; first means fixedly mounting said fingers to said housing with said fingers projecting from said housing beyond a first wall thereof; a switching device mounted within said housing and electrically connected to said fingers; an operating means for said switching device; said operating means including a handle extending externally of said housing for manually opening and closing said switching device; a first interlock means to prevent said plug unit from being mounted to and dismounted from a duct when said switching device is closed; a second interlock means to prevent opening of said cover when said switching device is closed; a third interlock means to prevent closing of said switching device when said cover is open; said operating means including a portion positioned within said housing and movable by said handle between an open and a closed position when said switching device is open and closed, respectively; said third interlock means including a section biased to a first position, operable to a second position by closing of said cover, and operable to a third position by said portion upon movement thereof to said closed position; said section when in said first position blocking movement of said portion to said closed position; said second interlock means including a catch mounted to said cover on the inside thereof; biasing means urging said catch to a latching position; said catch being operable from outside of said cover for unlatching said catch; with said cover closed, said catch in said latching position cooperating with said section in said third position to prevent opening of said cover; said first interlock means including a part extending from said housing in the same general direction as said fingers; said part being in a releasing position when said switching device is open to permit mounting and dismounting of said plug unit with respect to a duct; said portion when in said closed position operating said part to a holding position to prevent mounting and dismounting of said plug unit with respect to a duct; a single member wherein said part and said section are incorporated.

2. A plug unit as set forth in claim 1 in which there is a pivot-slot type means mounting said member to said housing whereby said member experiences generally linear motion as said section moves between said first and said second position, and said member is pivoted as said section moves between said second and said third positions; said pivot-slot type means is positioned at a point intermediate said part and said section.

3. A plug unit as set forth in claim 1 in which said member is elongated; a pivot-slot type means mounting said member to said housing whereby said member experiences generally linear motion as said section moves between said first and said second positions; and said member is pivoted as said section moves between said second and said third positions; said part positioned at one end of said member and said section positioned at the other end of said member.

4. A plug unit as set forth in claim 3 in which said section includes a notch and a lug; said portion including a projection; when said section is in said first position and said switching device is open said notch having said projection disposed therein in cooperating relationship to prevent closing of said switching device; with said section in said third position; said lug positioned to cooperate with said catch in said latching position to prevent opening of said cover.

5. A plug unit as set forth in claim 4 in which upon closing of said switching device said projection engages said member to pivot same and thereby operate said part to said holding position.

6. A plug unit as set forth in claim 5 said member includes a curved edge-portion between said section and said pivot-slot type means; said projection engaging said curved edge-portion as said switching device is closing.

7. A plug unit as set forth in claim 6 in which said portion is pivotally mounted to move in a plane parallel to a plane in which said member moves; said curved edge-portion positioned between said pivot-slot type means and said notch.

8. A plug unit as set forth in claim 7 in which there is a single spring connected between said housing and said member; said spring biasing said section to said first position and also biasing said part to said releasing position.

9. A plug unit as set forth in claim 1 in which there is a single spring connected between said housing and said member; said spring biasing said section to said first position and also biasing said part to said releasing position.

10. A plug unit as set forth in claim 9 in which there is a pivot-slot type means mounting said member to said housing whereby said member experiences generally linear motion as said section moves between said first and said section positions, and said member is pivoted as said section moves between said second and said third positions; said pivot-slot type means is positioned at a point intermediate said part and said section.

References Cited by the Examiner
UNITED STATES PATENTS

| | | | |
|---|---|---|---|
| 3,001,037 | 9/1961 | Cataldo | 200—50 |
| 3,033,951 | 5/1962 | Farnsworth | 200—50 |
| 3,033,952 | 5/1962 | Farnsworth | 200—50 |
| 3,048,672 | 8/1962 | Cataldo et al. | 200—50 |

ROBERT K. SCHAEFFER, *Primary Examiner.*

J. R. SCOTT, *Assistant Examiner.*